US010878100B2

(12) United States Patent
Connor et al.

(10) Patent No.: US 10,878,100 B2
(45) Date of Patent: Dec. 29, 2020

(54) SECURE BOOT PROCESSOR WITH EMBEDDED NVRAM

(71) Applicant: Intel Corporation, Santa Clara, CA (US)

(72) Inventors: Christopher Connor, Hillsboro, OR (US); Bruce Querbach, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 87 days.

(21) Appl. No.: 16/162,935

(22) Filed: Oct. 17, 2018

(65) Prior Publication Data

US 2019/0050573 A1 Feb. 14, 2019

(51) Int. Cl.
*G06F 21/57* (2013.01)
*G11C 11/34* (2006.01)
*G11C 7/20* (2006.01)
*G11C 7/24* (2006.01)

(52) U.S. Cl.
CPC .......... *G06F 21/575* (2013.01); *G06F 21/572* (2013.01); *G11C 7/20* (2013.01); *G11C 11/34* (2013.01); *G11C 7/24* (2013.01)

(58) Field of Classification Search
CPC .... G06F 9/44502; G06F 9/44508; G06F 1/24; G06F 9/44526; G06F 15/177; G06F 9/44514; G06F 9/44523; G06F 11/1417; G06F 9/44505
See application file for complete search history.

(56) References Cited

U.S. PATENT DOCUMENTS

| | | | |
|---|---|---|---|
| 9,658,859 B2* | 5/2017 | Le | G06F 9/4401 |
| 2009/0316499 A1* | 12/2009 | Hidaka | G11C 11/005 365/189.011 |
| 2013/0145080 A1* | 6/2013 | Grandin | G06F 9/44505 711/103 |
| 2017/0160338 A1* | 6/2017 | Connor | G11C 7/00 |
| 2018/0098162 A1* | 4/2018 | Vang | H04R 25/556 |
| 2019/0042351 A1 | 2/2019 | Connor et al. | |
| 2019/0042383 A1 | 2/2019 | Querbach et al. | |

* cited by examiner

*Primary Examiner* — Zahid Choudhury
(74) *Attorney, Agent, or Firm* — Compass IP Law PC (57) ABSTRACT

A processor semiconductor chip is described. The processor semiconductor chip includes at least one processing core. The processor semiconductor chip also includes a memory controller. The processor semiconductor chip also includes an embedded non flash non-volatile random access memory having a stack of storage cells disposed above the processor semiconductor chip's semiconductor substrate. The embedded non-volatile random access memory is to store boot up program code that, when executed by the processor semiconductor chip, is to analyze a subsequent module of program code so that a maliciously modified version of the subsequent module of program code can be identified. The embedded non-volatile random access memory to also store the subsequent module of program code.

18 Claims, 13 Drawing Sheets

SECURE BOOT PROCESSOR WITH EMBEDDED NVRAM

FIELD OF INVENTION

The field of invention pertains generally to a secure boot processor with embedded NVRAM.

BACKGROUND

Weakness in computer system security systems have received increased attention in recent years after a number of high profile "cyber attacks" and other security breaches. As such, there is a need to increase a computer system's ability to withstand any attempts at breaching the data the system processes and/or stores.

FIGURES

A better understanding of the present invention can be obtained from the following detailed description in conjunction with the following drawings, in which.

DETAILED DESCRIPTION

A core understanding with respect to the security of computer systems is that the incorporation of malicious software requires a change to the computer's software prior to the malicious attack. Therefore, if a computer can guarantee each time it boots up that its software has not changed, the computer can be deemed clean of any malicious software.

FIGS. 1a through 1e depict a prior art secure boot process that checks computer's firmware and software during boot-up and detects if any changes have been made to the firmware and software. Here, generally, results of the checking process are compared against known good values for the computer's specific versions of the firmware and software. If a check result does not match its corresponding good known value, a flag is raised and subsequent processes follow a pre-configured boot fail policy.

Figure 1A:
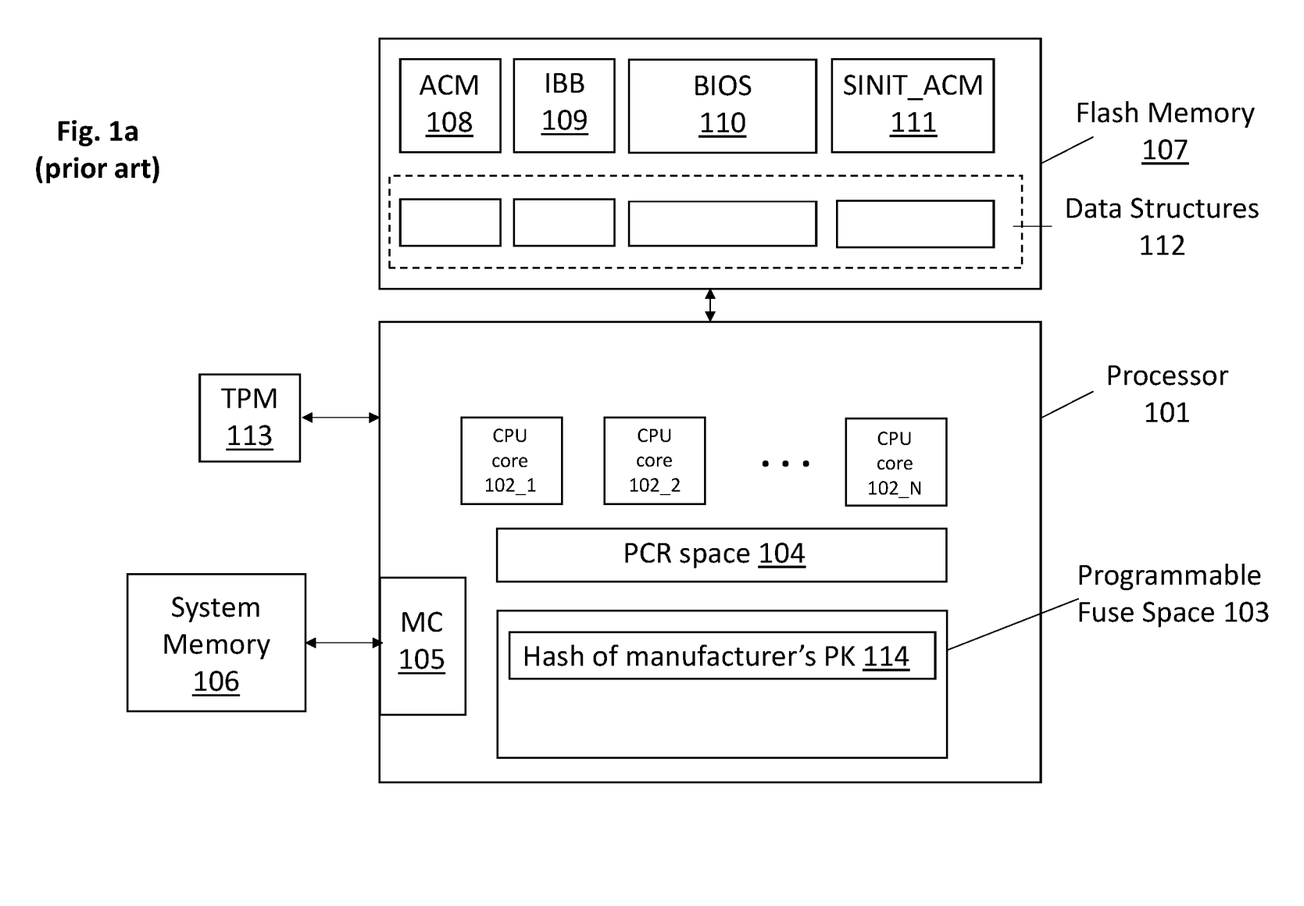
FIGS. 1a through 1e depict a traditional boot up process.

FIG. 1a, depicts the computer prior to a launch event (e.g., when the computer is powered down). As depicted in FIG. 1a, the computer includes a processor semiconductor chip 101 having multiple Central Processing Unit (CPU) processing cores 102_1 through 102_X that are to ultimately execute the computer's software, programmable fuses 103 to assist the secure boot process as described in more detail further below, platform configuration registers 104 (PCRs), and a main memory controller 105 that is coupled to a main memory 106 (also referred to as a "system memory").

The computer also includes a flash memory chip 107 that is separate and distinct from the processor semiconductor chip 101. The flash memory 107 includes, among other items, an authenticated code module (ACM) 108, an initial boot block (IBB) module 109, the BIOS program code 110 for the computing system and a SINIT ACM software module 111. The flash memory 107 also includes associated data structures 112 or other configuration information associated with these modules, other firmware and/or software modules of the computer and/or the computer, generally.

The computer also includes a trusted platform module 113 (TPM). The TPM 113, in various implementations, is an (e.g., ISO/IEC 11889) international standard compatible secure crypto-processor (e.g., a dedicated microcontroller) designed to secure computing platform components through integrated cryptographic keys. It generates RSA keys, calculates SHA-1 hashes and signs/validates electronic signatures for encryption/decryption.

Figure 1B:
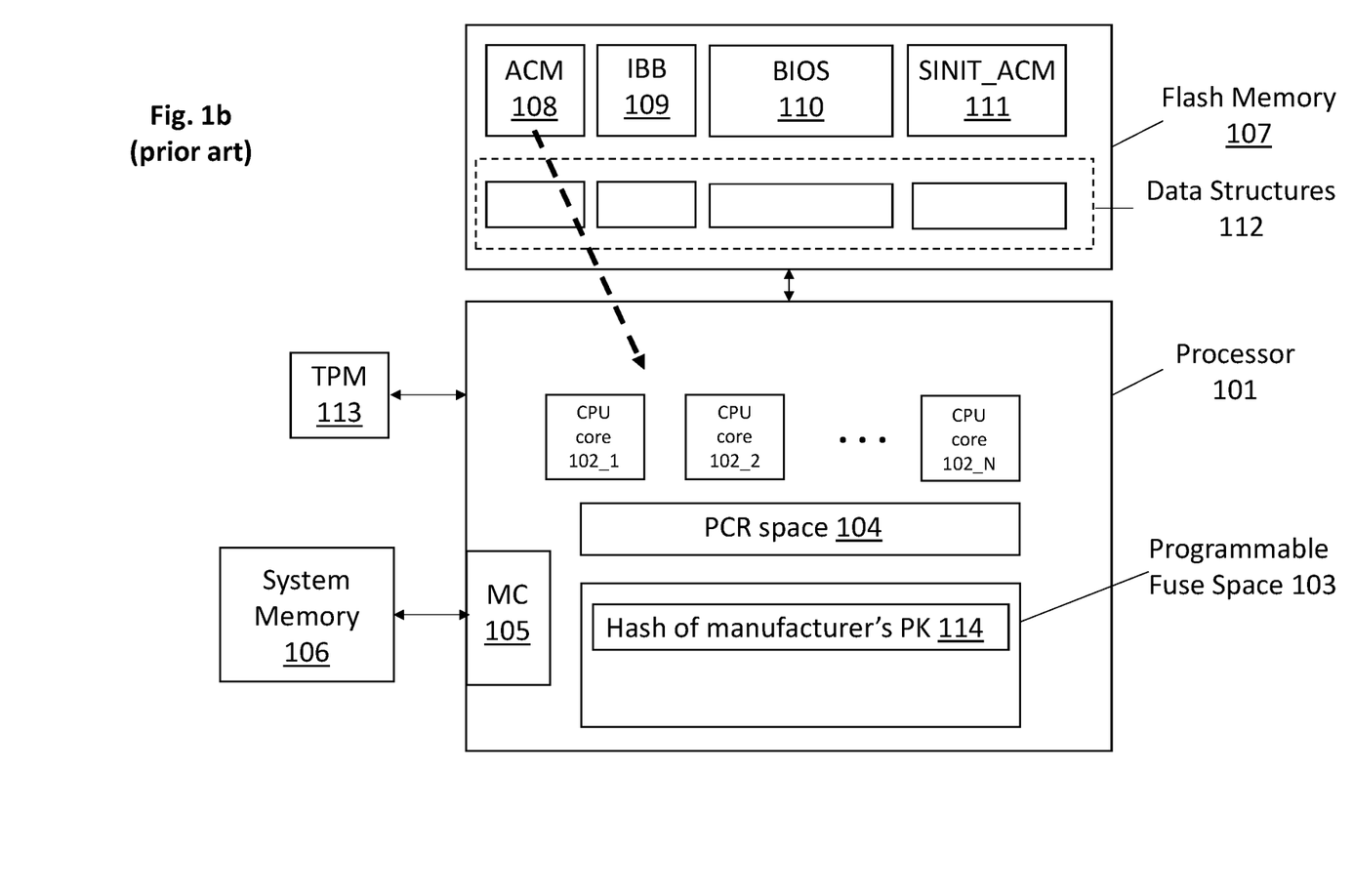

As observed in FIG. 1b, after an environment launch event (e.g., cold computer power on, warm computer reset, launching of new hypervisor or virtual machine, etc.) the authenticated code module (ACM) 108 is initially read from the flash memory 107. The ACM is validated by the processor 101 prior to the ATM being executed by the processor 101.

The technology used to validate the ACM includes the computing system and/or processor manufacturer (hereinafter, collectively referred to as "the manufacturer") configuring a public key for the validation. Specifically, the manufacturer generates a key that is only used for verifying an ACM, where, the private portion of the key is kept securely secret by the manufacturer. A hash of the public portion of the key 114 is programmed into the field programmable fuse space 103 of the processor 101 during the processor's or computing system's manufacturing process. The manufacturer invokes special "Management Mode" (MM) firmware of the processor 101 to program the public portion of the key 114 into the processor's fuse space 103. The MM firmware is then permanently disabled by the manufacturer by blowing a fuse in the fuse space 103 that prevents the processor from again executing the MM firmware.

The ACM 108 is digitally signed by the manufacturer and stored in the flash memory 107 as electronically signed program code. During bootup, the processor 101 uses the fuse blown embedded public key 114 to validate the signature of the ACM. If the ACM is validated, the ACM program code is executed 115 by the processor 101, as observed in FIG. 1c, to "measure" the initial boot block (IBB) module 109 prior to its full loading and execution.

Figure 1C:
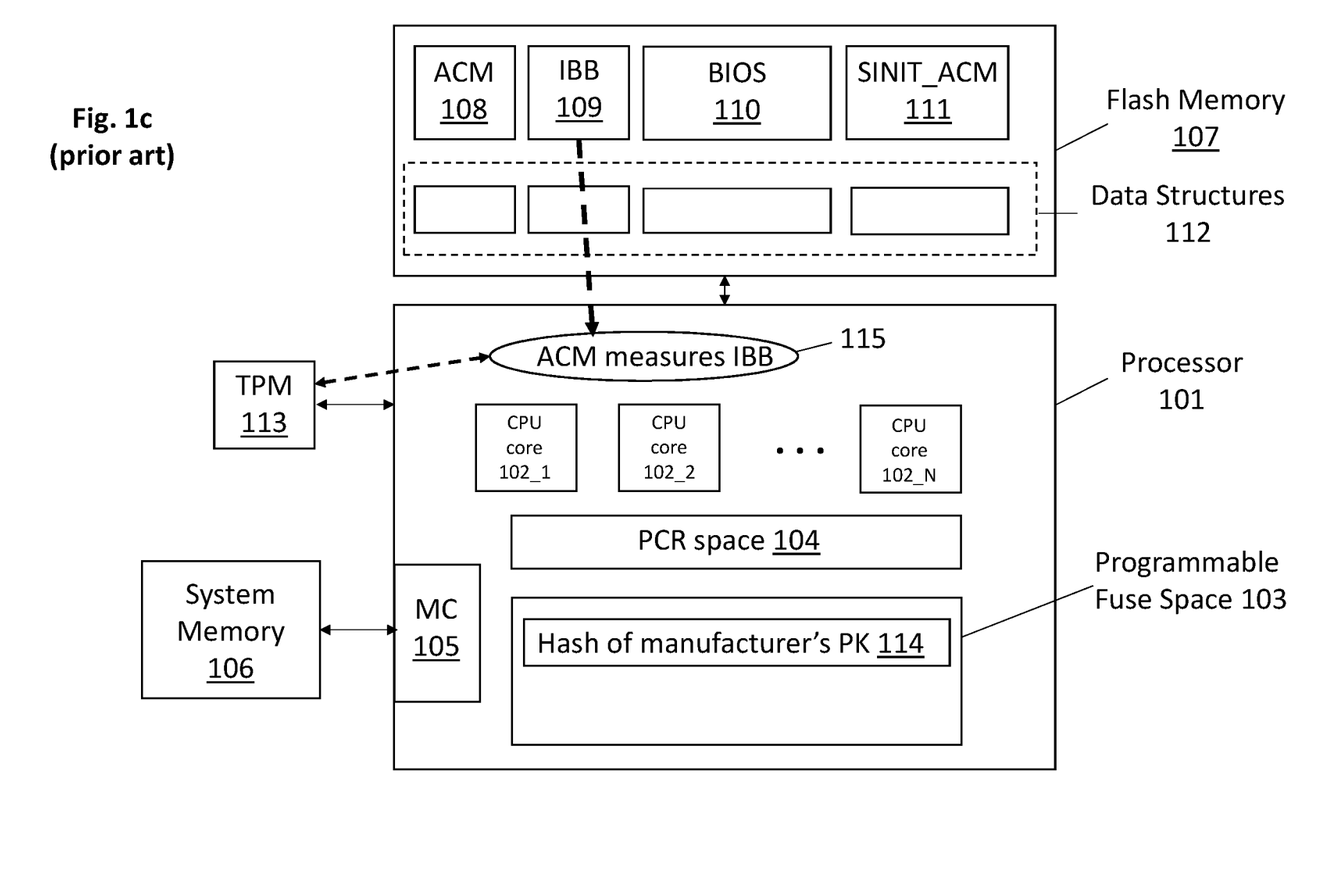

Here, the executing ACM code 115 invokes the TPM 113 to help perform the measurement process. Specifically, over the course of the IBB's measurement by the executing ACM code 115, the TPM repeatedly reads the current value of a platform configuration register (PCR), hashes it with the next measurement of the IBB code and/or IBB data structure (s) and replaces the content of the PCR with that hash result (PCR "extension"). The effect is that the only way to arrive at a particular measurement in a PCR is to extend exactly the same measurements in exactly the same order. Therefore, if the IBB has been undesirably modified, detection of the modification is straightforward because the resulting PCR measurement will be different than the IBB's known good value.

Alternatively or in combination, the IBB 109 may be validated according to a process that is similar to the above described validation of the ACM. That is, the processor 101 uses a hash of a public key of the IBB to validate the electronically signed IBB (the hash of the IBB's public key is stored in a "key manifest" data structure in flash memory 107). IBB validation may be used instead of the IBB measurement process described above. For example, some lower end systems may not include a TPM 113 and therefore cannot perform the measurement process (the IBB can only be validated). In systems that include a TPM 113, the IBB may be measured only, or, measured and validated.

Notably, the data structures 112 with the flash 107 also include boot policy information. Such boot policy information specifies whether IBB measurement or IBB validation is to be performed, whether both are to be performed or whether neither are to be performed (e.g., in an un-secure system). The boot policy information also specifies what actions are to take place if the ACM is not validated and/or what actions are to take place if the IBB is not verified (passes validation or measurement).

The IBB 109 is a special software module that verifies the integrity of the BIOS firmware 110. Here, as is understood in the art, the BIOS firmware 110 corresponds to very low level program code that configures or programs specific values into specific hardware components (such as the respective configuration register space of the hardware components) and/or contains executable code for performing low level processing tasks. The BIOS 110 can include various data structures that are relied upon by various low-level functions/tasks that are performed by the computer (e.g., specific values to be programmed into hardware register space and/or memory pages, coefficients for mathematical models that the computer uses to model temperature profiles, reliability assessments, etc.).

The BIOS 110 also can include the respective bodies of executable code that are to be executed by various embedded processors or micro-controllers that reside within the computer (e.g., the embedded controller of a solid state drive (SSD)). The term "BIOS" is used generally to refer to such low level software and can refer to true Basic Input Output System compatible firmware as well as more recent firmware formats (e.g., Unified Extensible Firmware Interface (UEFI)).

Figure 1D:
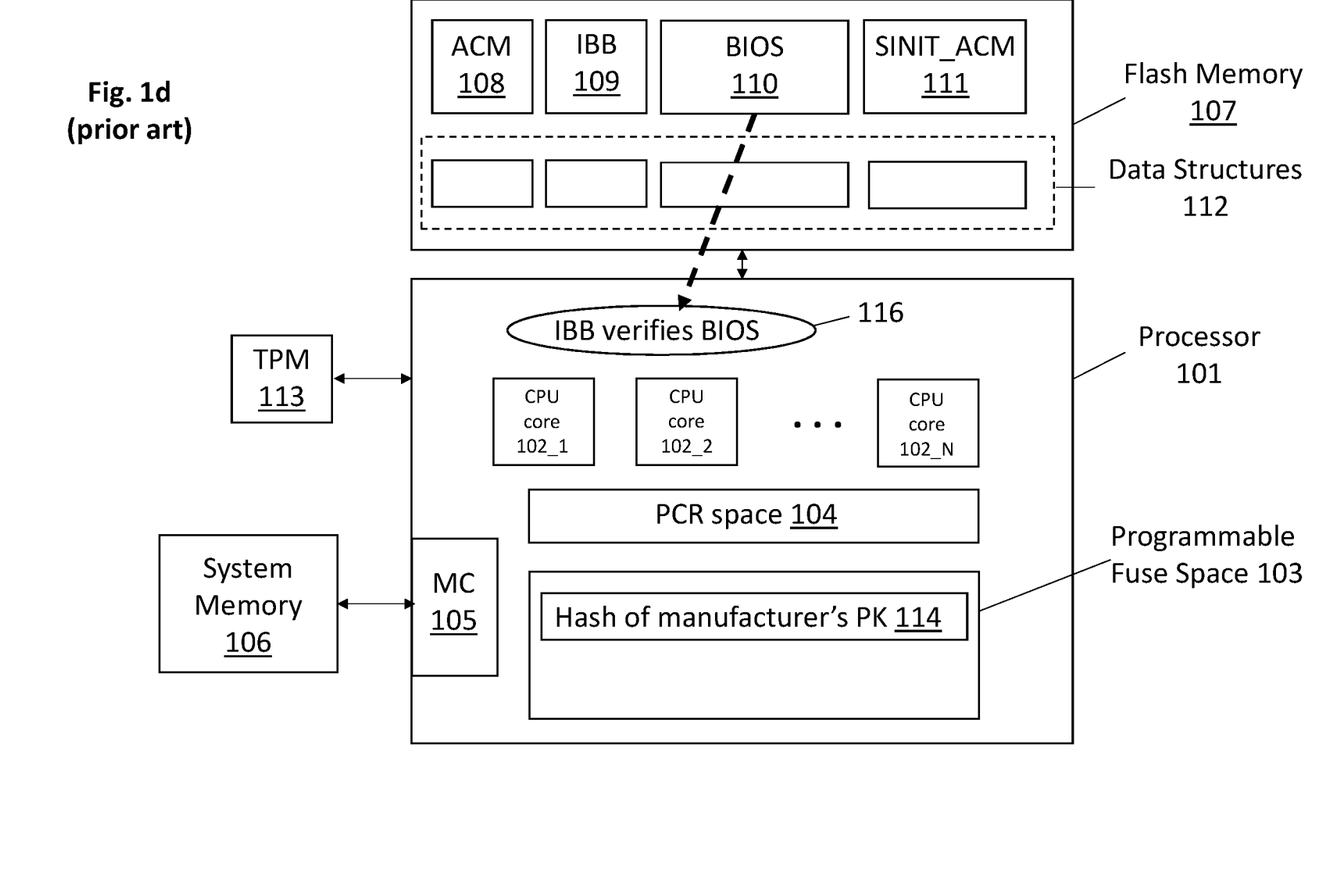

After successful measurement and/or validation of the IBB, as observed in FIG. 1*d*, the IBB module is executed 116 by the processor. According to various implementations, the IBB footprint is small enough to be kept by (and therefore executed from) internal memory space of the processor. The executing IBB 116 is responsible for checking the integrity of the various BIOS program code modules, initializing main memory, and loading BIOS program modules into the system memory. This can include BIOS verification of executable BIOS code, BIOS configuration information, system management mode (SMM) code, option ROM code and configuration, system state, master boot record, and boot configuration. Here, the executing IBB 116 may invoke the TPM 113 to measure any/all of these BIOS components or may perform some other verification method (e.g., validation against public keys for each of the modules where such keys are stored in the flash and/or the programmable fuse space of the processor).

Figure 1E:
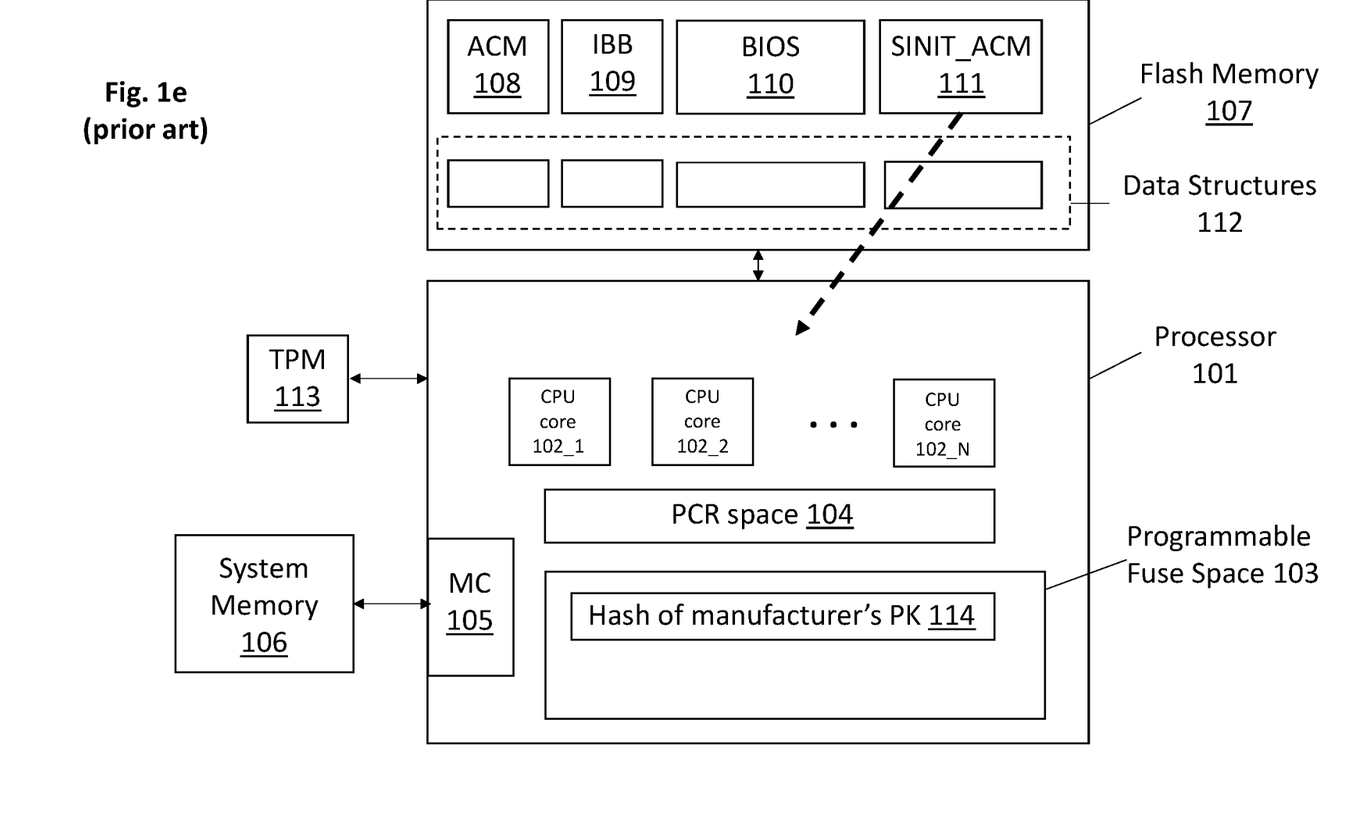

After the BIOS has been verified and successfully loaded, as observed in FIG. 1*e*, the operating system (OS) boot process is commenced. According to at least one OS boot process approach, the signature and integrity of another specialized software module, the SINIT ACM 111, is validated by the processor. After its validation, the SINIT ACM 111 is executed by the processor to measure the first OS code module (referred to as the measured launch environment (MLE) module). Before the MLE is allowed to execute, the SINIT ACM 111 verifies that the computer's hardware platform meets the requirements of a Launch Control Policy (LCP) set by the platform owner.

In x86 based systems, the aforementioned process is referred to as Trusted Execution Technology (TXT) with boot guard. Here, the boot guard corresponds to the introduction of the IBB into the boot-up process with the remainder of the process being referred to as the TXT boot-up sequence or environment.

For Power Architecture and ARM processors, the trusted boot process requires an application, including the boot code, to be signed using an RSA private signature key. The digital signature and public key is appended to the image in the flash memory. A hash of the public key is programmed into the programmable fuse space of the processor. When the processor boots, it begins executing from internal secure boot code (ISBC), stored in non-volatile memory inside the processor. The ISBC authenticates the public key using the stored hash value. The public key then authenticates the signature for the externally stored boot and application code. The external code may contain its own validation data similar to the ISBC. This process can break the external code into many smaller chunks that are validated separately by the previous code chunk. In this way the Trust Architecture can extend to subsequent software modules to establish a chain of trust.

From the above, it should be clear that large amounts of program code and associated data structures are stored in the flash memory 107 and processed by the processor 101 during boot up. That is, for boot-up purposes, whereas the processor 101 only includes the hash of the manufacturer's public key 114 (located in fuse space 103), by contrast, substantially all of the boot-up code and data structures reside in the flash memory 107.

Specifically, with respect to program code, the flash memory 107 includes the ACM, the IBB, the BIOS program code, the SINIT ACM, the MLE, etc. The flash memory 107 also stores data structures 112 associated with any of these software modules including, to name a few: 1) a key manifest (which includes a key manifest security version number, a hash of the IBB public key and a signature on the key manifest security version number); 2) an IBB manifest (which includes an IBB security version number, a hash of the IBB and an electronic signature on the IBB security version number); 3) TPM policy information; 4) boot up policy information; 5) BIOS policy information; 6) IBB policy information; 7) TXT policy information; 8) the vendor, device and revisions IDs for the applicable processor and/or memory controller; 9) the physical base address and size of the memory region set aside by the BIOS for loading the SINIT AC; 10) the physical address pointer and size of the TXT Heap memory region (the Heap memory region is a region of physically contiguous memory that is set aside by BIOS for the use of the TXT boot up process); 11) the DMA Protected Range of memory in which the TXT heap and SINIT region are located; 12) known good measurement values for any of the ACM, the SINIT ACM, the MLE the various BIOS program code modules and BIOS data structures that are measured; 13) version identifiers for any of the ACM, SINIT ACM or MLE; 11) LCP related information (e.g., the hash of the known good values for the LCP, the LCP's known good values, etc.); 14) a TPM owner password; 15) a TPM factory default owner password; 16) the version of the TPM; 17) an Endorsement Key (EK) for the TPM; 18) a Storage Root Key (SRK) for the TPM; 19) SGX configuration information such as whether or not SGX is enabled and enclave size (SGX allows software in user-level mode to create isolated secure environments called "enclaves" for storing data or code); 20) signatures for externally stored instances of boot-up and application code (e.g., in non x86 systems); etc.

Importantly, the above list is not comprehensive but is nevertheless extensive, and demonstrates the complexity and amount of boot-up and BIOS related data structure information 112 that can reside in the flash memory 107 along with the boot-up and BIOS program code. The BIOS code 110 itself can include many different kinds of associated data structures associated with computer at large such as coefficients for reliability and/or temperature modeling equations and configuration settings for specific hardware circuits (e.g., phase locked loop (LLP) settings, clock settings, power and/or voltage regulator settings, termination resistance settings, SSD refresh schedule timing information, etc.).

With the large amounts of boot-up and BIOS program code and data structure information 112 being stored in the flash memory 107, the storage capacity of the flash memory 107 itself is typically on the order of megabytes and has been trending higher over the years as computing systems become more complex, including the incorporation of more sophisticated secure boot-up technologies.

For attackers, it is preferable to compromise a component that is loaded earlier than one loaded later, because taking control at an early stage enables control over all subsequent components. Successful attacks against user-mode (e.g., application) software programs are becoming less and less the target of attacks. Instead, the BIOS and early stage boot-up programs are becoming the focus of more sophisticated attacks. Moreover, various forms of malicious attack (e.g., anti-replay) take advantage of the fact that the flash memory 107 is a separate semiconductor chip 101 than the processor and attempt to write malicious program code changes, etc. to the program code and/or data structure information that is stored in the flash memory.

Storing more of the flash memory contents in the processor's fuse space 103 would help to improve the security exposure. However, the programmable fuse space 103 is extremely limited. In a typical processor, there are 1024 programmable fuses in a 32×32 array layout. About one in every four fuses is reserved for locking, repairing, and redundancy check purposes, leaving only a few hundred fuses for other uses such as supporting a secure boot process.

An emerging trend in semiconductor manufacturing and computer design is the emergence of non flash, non volatile random access memories (generally referred to as "NVRAM"). In general, the storage cells of many of NVRAM technologies are integrated above the semiconductor substrate (e.g., within and/or amongst the semiconductor chip's inter-connect wiring) rather than being embedded in the semiconductor substrate. As such, the storage cells are capable of being stacked, e.g., in three dimensional arrays, above the semiconductor substrate and, likewise, can obtain high storage densities above smaller semiconductor chip surface areas.

Here, for instance, a storage cell may reside between orthogonally directed metal wires and a three-dimensional cross-point structure can be realized by stacking cells and their associated orthogonal wiring amongst the semiconductor chip's interconnect wiring metallurgy. The storage cells of many of these emerging NVRAM technologies generally store different resistive states (the cell exhibits a higher resistance or a lower resistance depending on whether it has been programmed with a 1 or a 0).

Additionally, the access granularities may be much finer grained than traditional non volatile storage (which traditionally accesses data only in large page, sector or block based accesses). That is, an emerging non volatile memory may be designed to act as a true random access memory that can support data accesses at byte level granularity or some modest multiple thereof per address value that is applied to the memory. Moreover the average access times of emerging NVRAM memories tend to be faster than flash (at least for one or the other of read and write accesses).

Examples of such emerging NVRAM technologies include Ferroelectric random access memory (FeRAM), dielectric random access memory, resistive random access memory (ReRAM), Memristor random access memory, phase-change random access memory, three-dimensional crosspoint random access memory, magnetic random access memory (MRAM), spin-torque transfer magnetic random access memory (STT-MRAM), etc.

Figure 2:
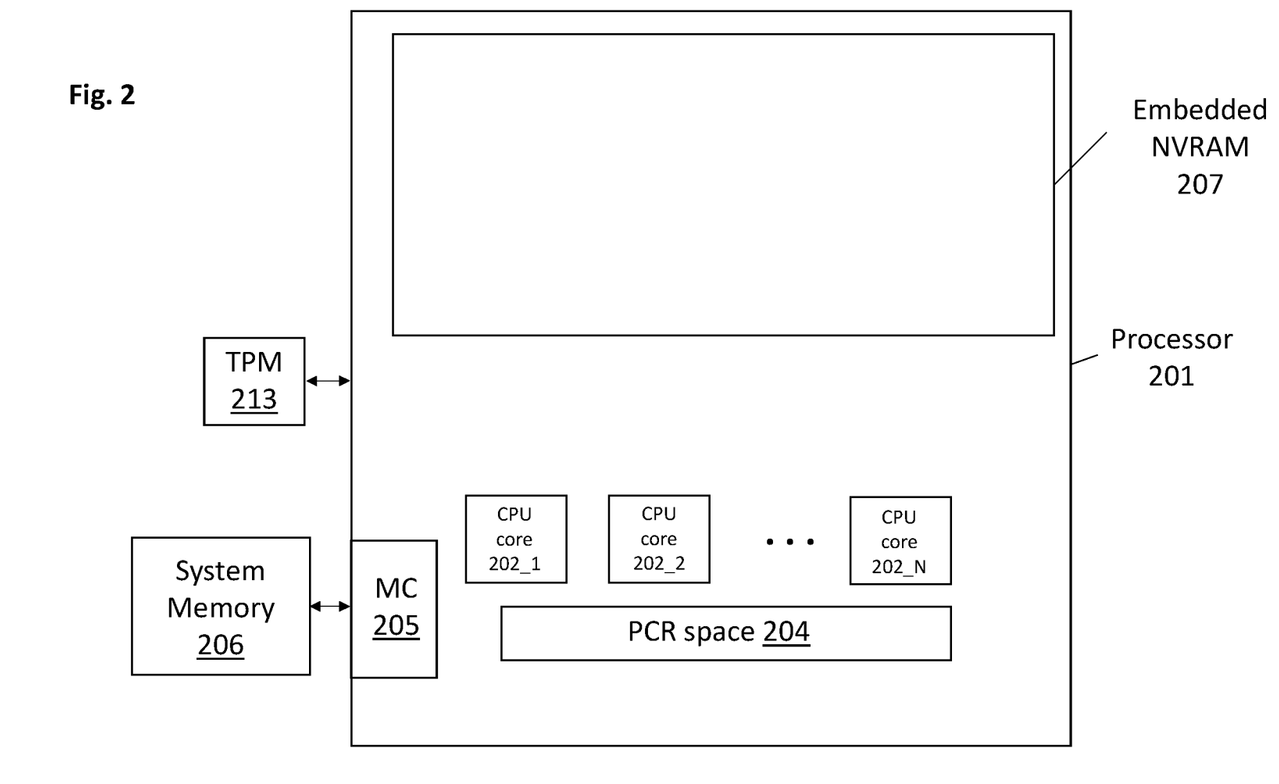
FIG. 2 depicts a processor semiconductor chip having a sufficient amount of embedded non flash non volatile random access memory storage capacity to store boot up and BIOS program code modules.

Importantly, at least some of these technologies can be integrated into a high density logic circuit manufacturing process such as a manufacturing process used to manufacture a processor semiconductor chip. FIG. 2 therefore shows an improved processor 201 that includes a significant storage capacity of embedded NVRAM 207 as a total or partial replacement for the flash memory and/or the processor on board fuses.

The embedded NRAM memory 207, like the flash memory and on board fuses, as discussed at length above, is non-volatile and therefore keeps its information even after power has been removed from the computing system. Moreover, the NVRAM 207 is integrated onto the same semiconductor chip as the processor 301 which generally makes attacks that rely upon the processor and flash being integrated on separate semiconductor chips (e.g., anti-replay attacks) more difficult if not impossible to effect.

Depending on implementation, the amount of embedded NVRAM 207 that is integrated on the processor die 201 may be sufficient to keep much of the information that has traditionally been stored in the flash memory. FIG. 2 suggests a sufficiently large embedded NVRAM capacity as it depicts each of the ACM, the IBB, the BIOS and SINIT ACM program code modules 308, 309, 310, 311 and their associated data structures 312 being stored on the processor chip 301 in its embedded NVRAM storage space 307. FIG. 2 also shows that the embedded NVRAM 307 effectively replaces the fuse technology for boot-up purposes as the hash of the manufacturer's public key 314 is stored in the embedded NVRAM 307 and not in any fuses. Alternate embodiments may keep the fuse technology and its use to store the hash of the manufacturer's public key there. Notably, any/all of the data structures listed above with respect to FIGS. 1a through 1e, and/or similar data structures, may be stored in the embedded NVRAM 307.

FIGS. 3a through 3e shows the boot-up process of FIGS. 1a through 1e but where the invoked instances of program code and their associated data structures are called from the embedded NVRAM 307 rather than an external flash memory.

Figure 3A:
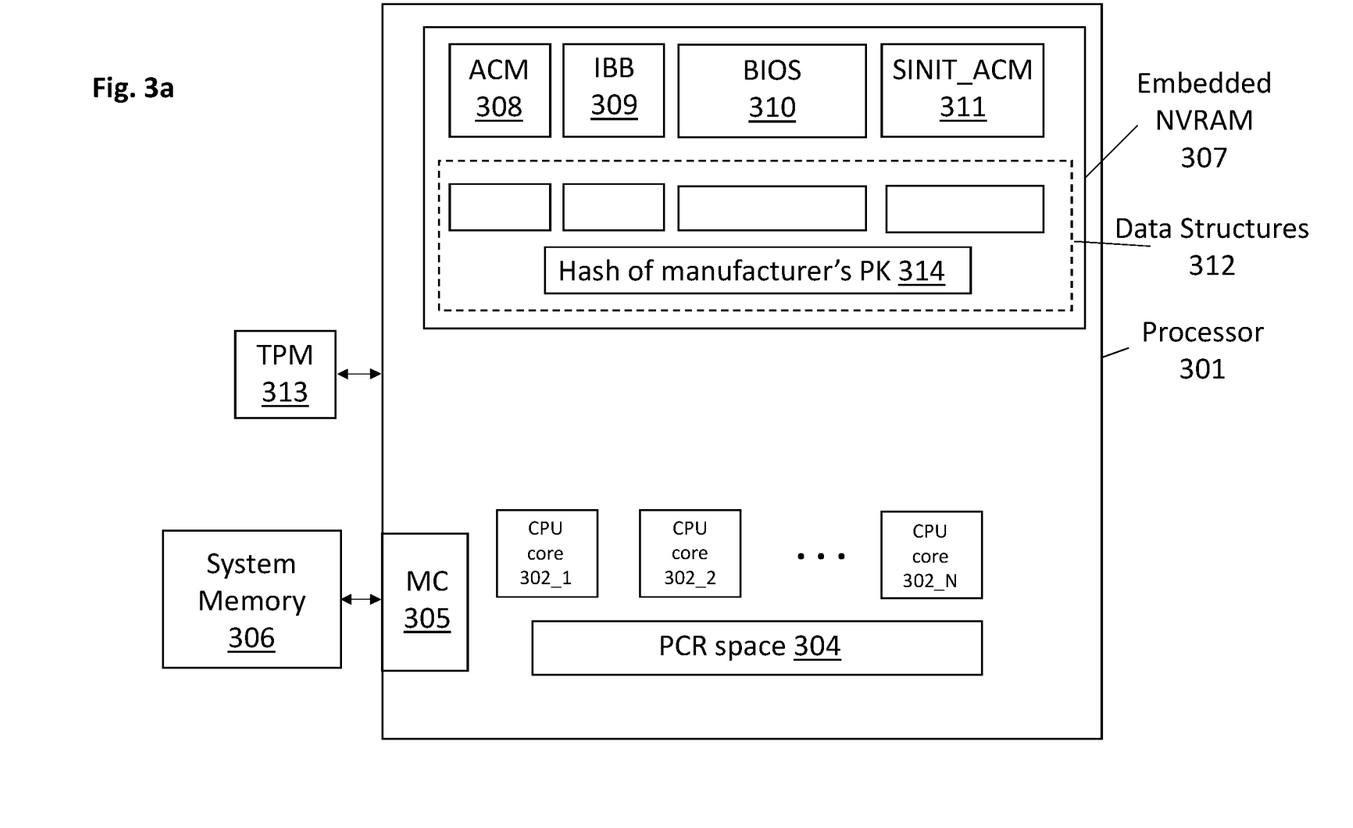
FIGS. 3a through 3e depict a boot up process in which boot up program code modules and BIOS program code modules are called from an embedded non flash non volatile random access memory.
Figure 3B:
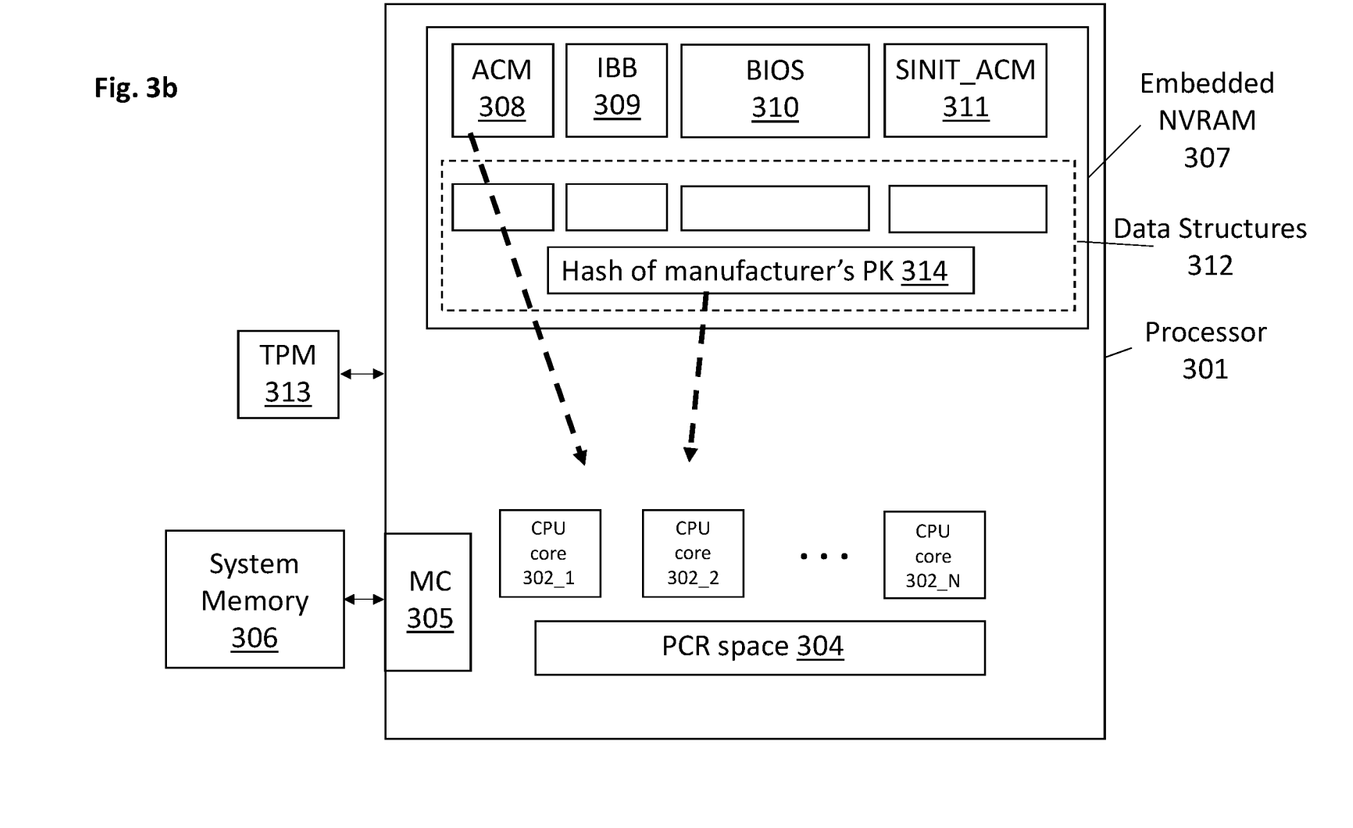
Figure 3C:
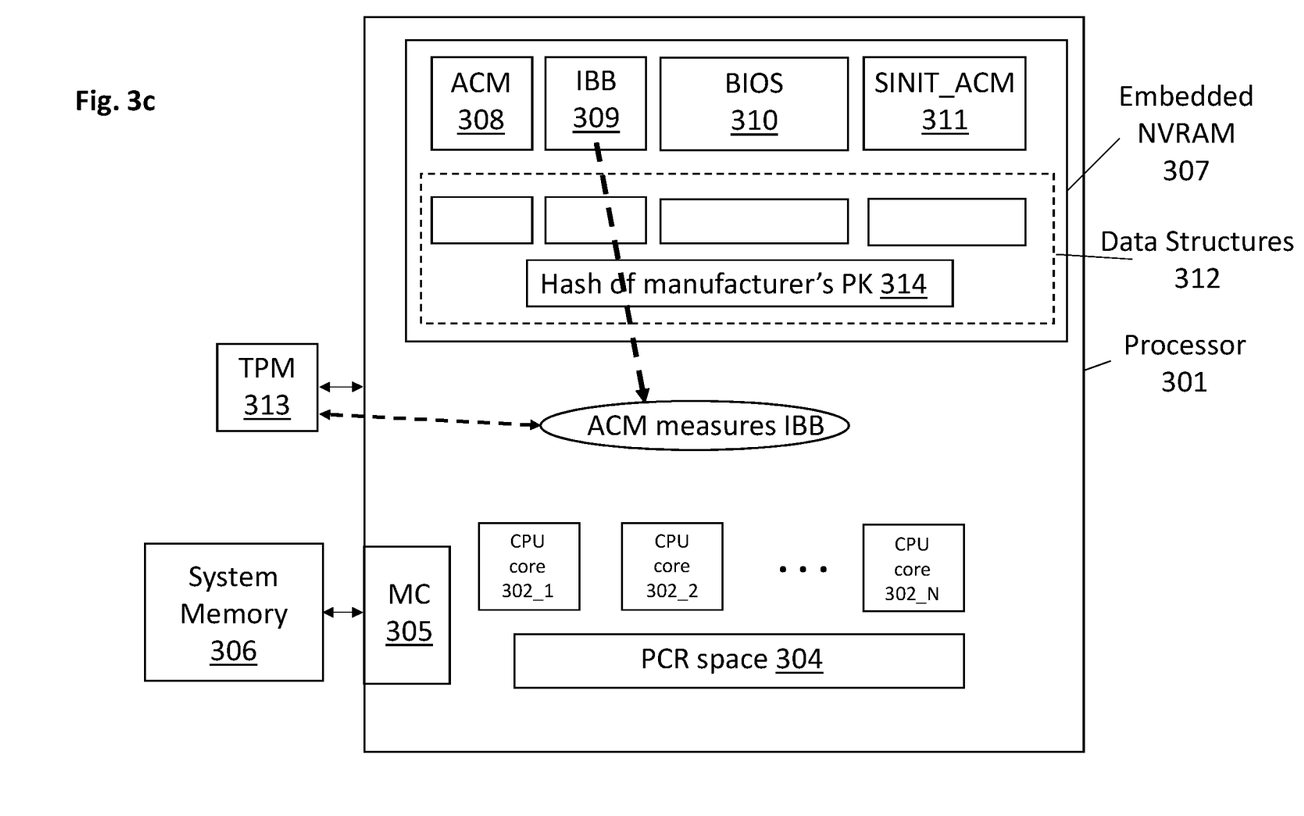
Figure 3D:
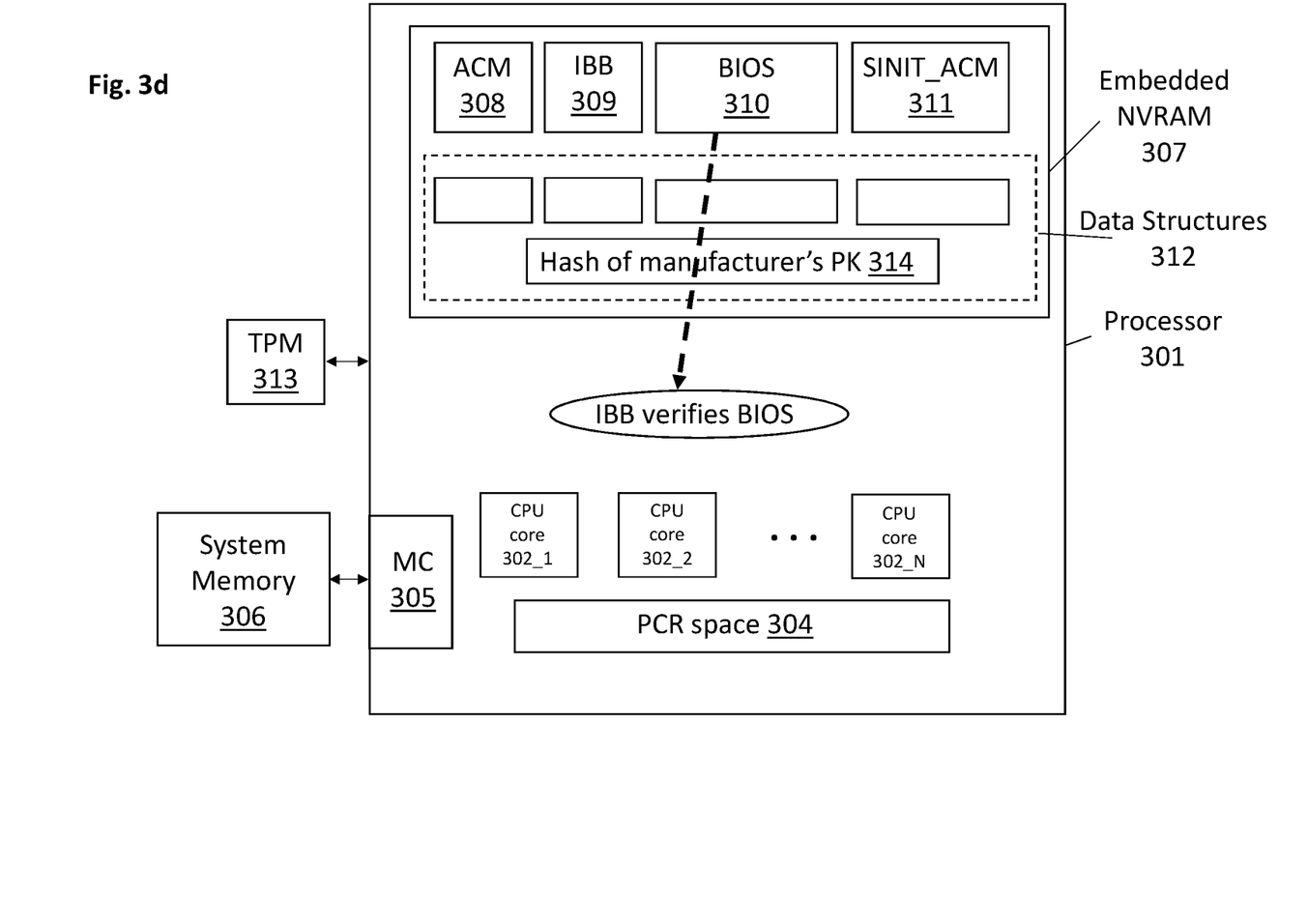
Figure 3E:
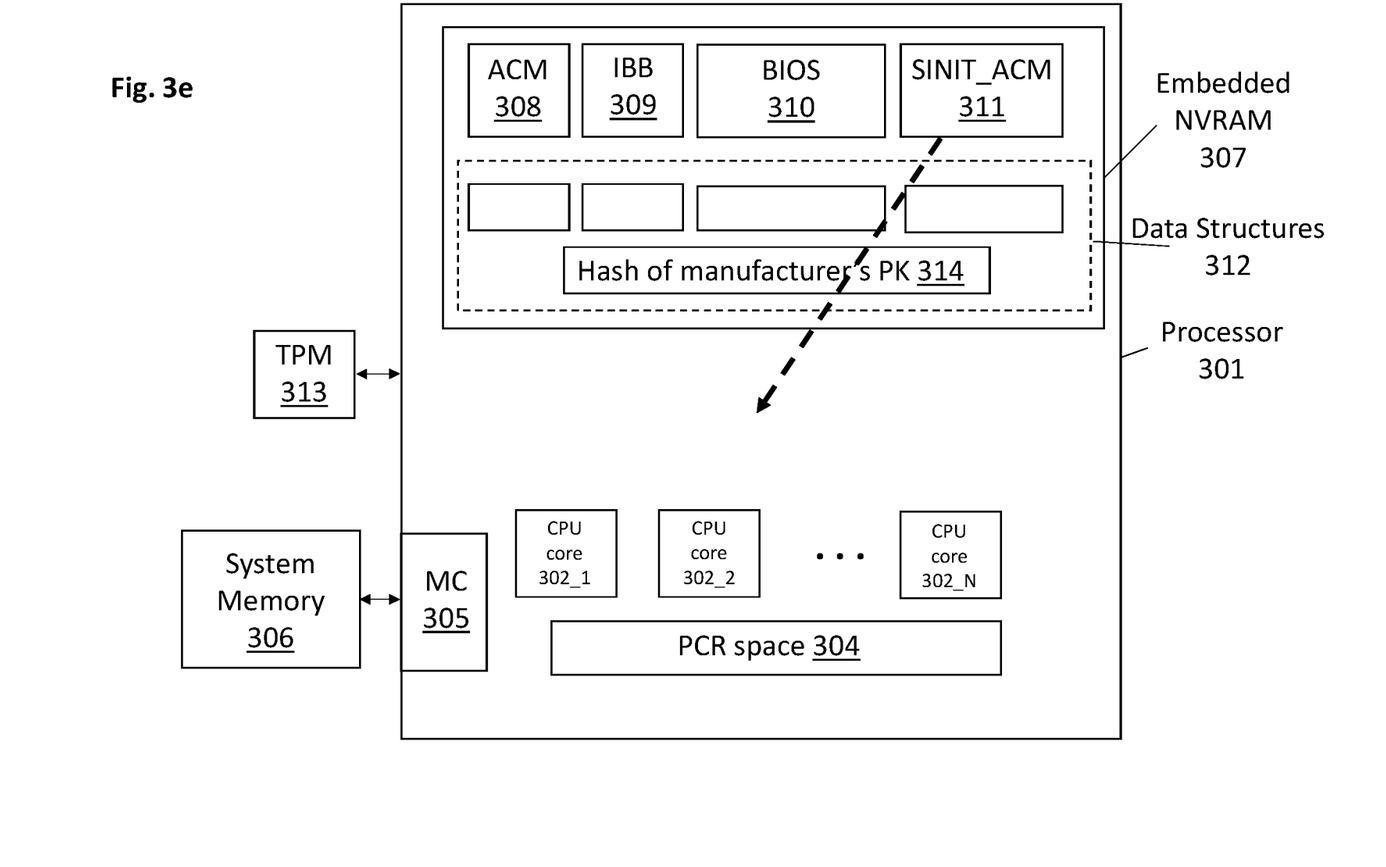

Specifically, FIG. 3a shows the system before a launch event. FIG. 3b shows the validation of the ACM after a launch event. Here, the ACM may be measured or validated or both depending on configuration. FIG. 3c shows the measuring of the IBB by the executing ACM. FIG. 3d shows verification of the BIOS code by the executing IBB. FIG. 3e shows commencement of the OS boot process. Here, program code modules that follow the SINIT ACM in the boot up process and their associated data structures (e.g., a measured launch environment (MLE) module and a data structure associated with the MLE module) may also be stored in the embedded NVRAM but are not shown in FIGS. 3a through 3e for illustrative convenience.

Notably apart from providing protection against at least the types of attacks that need the processor to be a separate chip than the chip where the boot-up code and BIOS are stored, not that monolithic integration of the boot-up code and BIOS information on the same die as the processor can result in faster boot up times because higher speed information transfers are generally achievable on-die than off-die communications between chips.

Additionally, although "absolute" security of sensitive and/or important information is achievable by designing the NVRAM to be write once (e.g., the ability to write to certain NVRAM cells is disabled after they are written to once), other types of information (e.g., less security sensitive information) that are presently fused into the processor, and therefore are not capable of modification, may benefit from being stored in non write once NVRAM space. For example, current processor fuse settings set the processor's internal clock speeds and/or amounts of caching space at different caching levels (e.g., L1, L2). Once the fuse settings are set they cannot be reversed or changed. However, if such information were kept in the embedded NVRAM in non write once space (i.e., space that can be written to more than once), such information could subsequently be changed (e.g., while the processor is in the field). For example, if a newer, lower temperature thermal environment were detected or established for the processor in the field, the processor's internal clock speeds could be increased by changing processor clock speed settings in non write once embedded NVRAM space.

Figure 4:
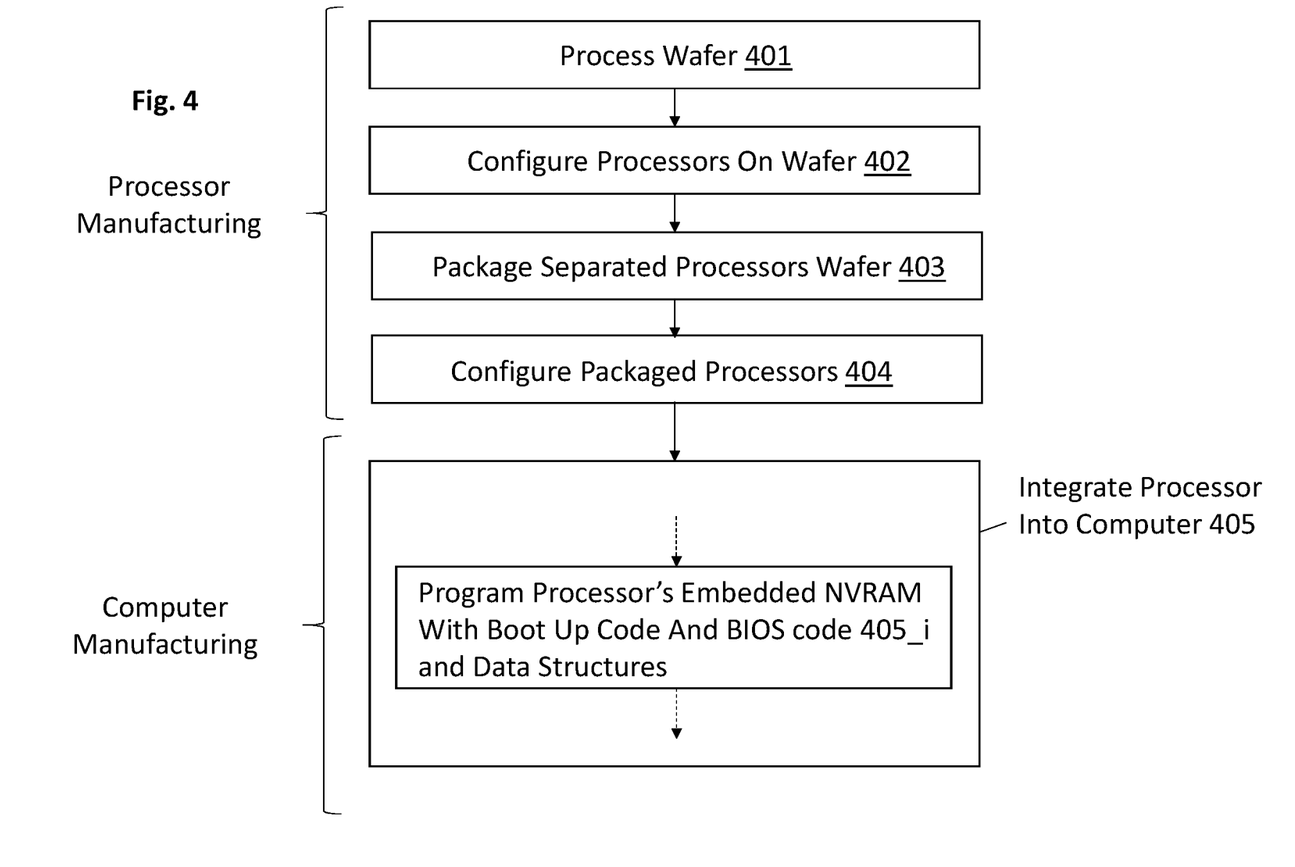
FIG. 4 shows a method for manufacturing a processor and computer having the processor that includes programming the processor's embedded non flash non volatile random access memory with boot up and BIOS program code modules.
Figure 5:
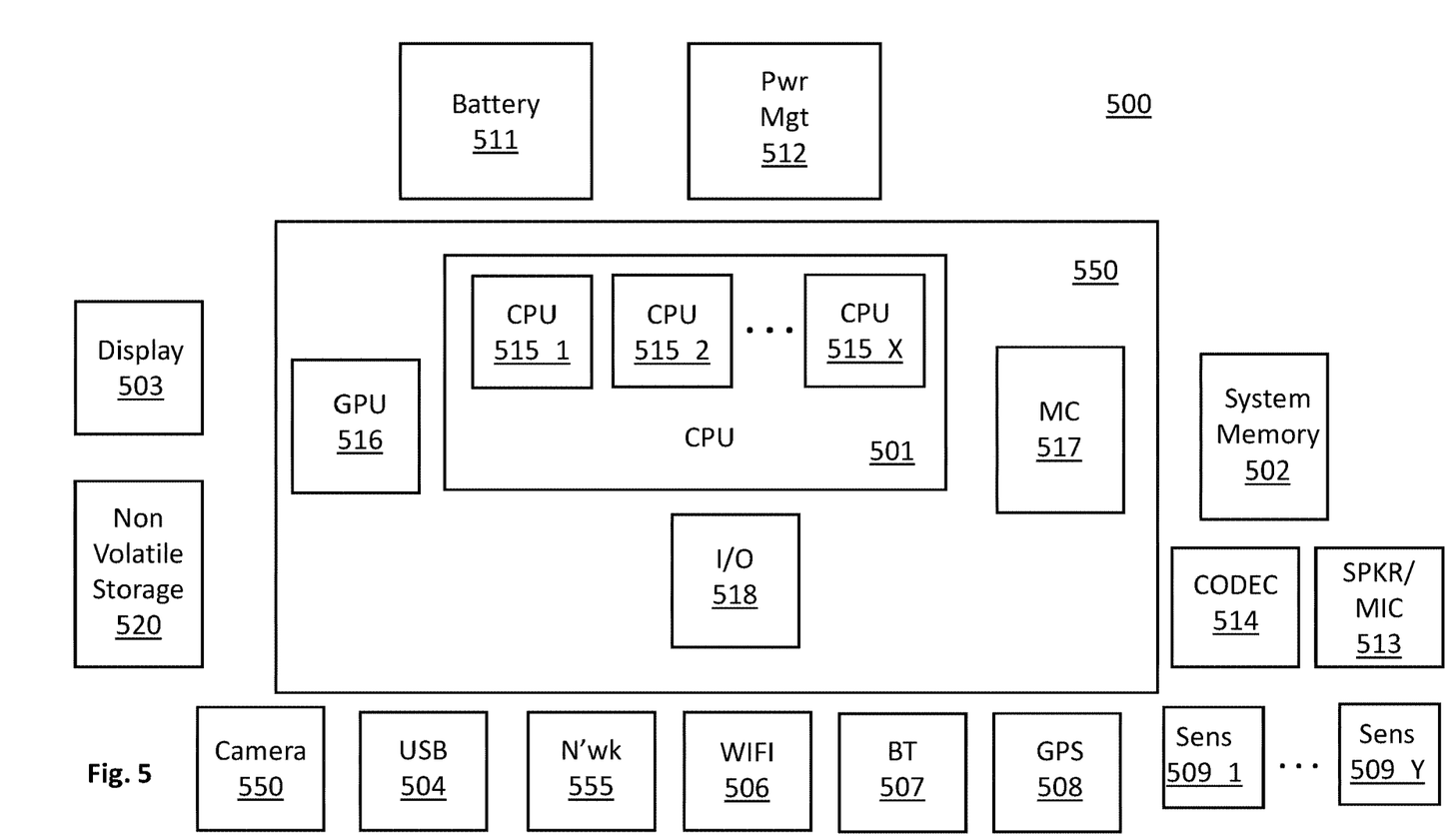
FIG. 5 shows a computing system.

FIG. 4 shows a manufacturing flow for a processor and the computing system that the processor is integrated into. As observed in FIG. 4, first a semiconductor wafer is processed so as to fabricate multiple processor die 401. Certain configuration settings are then programmed into the processors on wafer 402 (e.g., laser ablation of fuses for fuses, if any, that embedded NVRAM does not take the place of). The wafer is then diced 403 and the processors are individually packaged 404. Additional configuration settings may then be programmed into the packaged processors 404. Here, configuration processes 402 and 404 may include programming of the processor's embedded NVRAM. For example, the ACM and/or IBB may be programmed into the processor's embedded NVRAM during processes 402 or 404.

The processor is then shipped to the computer manufacturer where the processor is integrated into the computing system 405. As part of the integration 405_i, the processor's embedded NVRAM storage cell array is loaded with boot-up process program code and associated data structures, BIOS program code and associated data structures and OS boot-up program code and associated data structures. If the ACM and IBB were not programmed into the processor by the processor manufacturer, they may be programmed into the processor by the computer manufacturer at process 405_i. In other embodiments, e.g., where the processor has less than a few megabytes of embedded NVRAM storage space, some subset of the above described information is programmed into the processor's embedded NVRAM storage space.

FIG. 6 provides an exemplary depiction of a computing system 600 (e.g., a smartphone, a tablet computer, a laptop computer, a desktop computer, a server computer, etc.). As observed in FIG. 6, the basic computing system 600 may include a central processing unit 601 (which may include, e.g., a plurality of general purpose processing cores 615_1 through 615_X) and a main memory controller 617 disposed on a multi-core processor or applications processor, system memory 602, a display 603 (e.g., touchscreen, flat-panel), a local wired point-to-point link (e.g., USB) interface 604, various network I/O functions 605 (such as an Ethernet interface and/or cellular modem subsystem), a wireless local area network (e.g., WiFi) interface 606, a wireless point-to-point link (e.g., Bluetooth) interface 607 and a Global Positioning System interface 608, various sensors 609_1 through 609_Y, one or more cameras 610, a battery 611, a power management control unit 612, a speaker and microphone 613 and an audio coder/decoder 614.

An applications processor or multi-core processor 650 may include one or more general purpose processing cores 615 within its CPU 601, one or more graphical processing units 616, a memory management function 617 (e.g., a memory controller) and an I/O control function 618. The general purpose processing cores 615 typically execute the operating system and application software of the computing system. The graphics processing unit 616 typically executes graphics intensive functions to, e.g., generate graphics information that is presented on the display 603. The memory control function 617 interfaces with the system memory 602 to write/read data to/from system memory 602. The power management control unit 612 generally controls the power consumption of the system 600.

Each of the touchscreen display 603, the communication interfaces 604-507, the GPS interface 608, the sensors 609, the camera(s) 610, and the speaker/microphone codec 613, 614 all can be viewed as various forms of I/O (input and/or output) relative to the overall computing system including, where appropriate, an integrated peripheral device as well (e.g., the one or more cameras 610). Depending on implementation, various ones of these I/O components may be integrated on the applications processor/multi-core processor 650 or may be located off the die or outside the package of the applications processor/multi-core processor 650. The computing system also includes non-volatile storage 620 which may be the mass storage component of the system.

The processor 650 may also include a sufficiently large amount of embedded NVRAM to store much of the computer's boot up program code, BIOS program code and associated data structures.

Embodiments of the invention may include various processes as set forth above. The processes may be embodied in machine-executable instructions. The instructions can be used to cause a general-purpose or special-purpose processor to perform certain processes. Alternatively, these processes may be performed by specific/custom hardware components that contain hardwired logic circuitry or programmable logic circuitry (e.g., field programmable gate array (FPGA), programmable logic device (PLD)) for performing the processes, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, FLASH memory, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A processor semiconductor chip, comprising:
   a) at least one processing core;
   b) a memory controller; and
   c) a embedded non flash non-volatile random access memory comprising a stack of storage cells disposed above a semiconductor substrate of the processor semiconductor chip, the embedded non-volatile random access memory to store boot up program code that, when executed by the processor semiconductor chip, is to analyze a subsequent module of program code so that a maliciously modified version of the subsequent module of program code can be identified, wherein the boot up program code is designed to invoke a trusted platform module (TPM) that measures the subsequent module of program code by performing a sequence of hashes on the subsequent module of program code, the embedded non-volatile random access memory to also store the subsequent module of program code.

2. The processor semiconductor chip of claim 1 wherein the boot up program code is to analyze BIOS program code.

3. The processor semiconductor chip of claim 1 wherein the boot up program code comprises initial boot block program code.

4. The processor semiconductor chip of claim 1 wherein the boot up program code is to analyze another boot up program code module.

5. The processor semiconductor chip of claim 4 wherein the boot up program code comprises authenticated code module (ACM) program code.

6. The processor semiconductor chip of claim 1 wherein the boot up program code comprises SINIT ACM program code.

7. A processor semiconductor chip, comprising:
   a) at least one processing core;
   b) a memory controller; and,
   c) a embedded non flash non-volatile random access memory comprising a stack of storage cells disposed above a semiconductor substrate of the processor semiconductor chip, the embedded non-volatile random access memory to store boot up program code and a data structure associated with the boot up program code, wherein, the boot up program code, when executed by the processor semiconductor chip, is to analyze a subsequent module of program code so that a maliciously modified version of the subsequent module of program code can be identified, wherein the boot up program code is designed to invoke a trusted platform module (TPM) that measures the subsequent module of program code by performing a sequence of hashes on the subsequent module of program code, the embedded non-volatile random access memory to also store the subsequent module of program code and another data structure associated with the subsequent module of program code.

8. The processor semiconductor chip of claim 7 wherein the data structure comprises an electronic signature.

9. The processor semiconductor chip of claim 8 wherein the another data structure comprises another electronic signature.

10. The processor semiconductor chip of claim 7 wherein the data structure comprises a first policy.

11. The processor semiconductor chip of claim 10 wherein the embedded non flash non volatile memory is to store a TPM policy.

12. The processor semiconductor chip of claim 7 wherein the boot up program code comprises ACM program code.

13. The processor semiconductor chip of claim 7 wherein the data structure is a key.

14. The processor semiconductor chip of claim 7 wherein the another data structure is a key.

15. A computing system, comprising:
   a) a TPM;
   b) a system memory; and,
   c) a processor semiconductor chip coupled to the TPM and the system memory, the processor semiconductor chip, comprising:
      i) at least one processing core;
      ii) a memory controller;
      iii) an embedded non flash non-volatile random access memory comprising a stack of storage cells disposed above a semiconductor substrate of the processor semiconductor chip, the embedded non-volatile random access memory to store boot up program code that, when executed by the processor semiconductor chip, is to analyze a subsequent module of program code so that a maliciously modified version of the subsequent module of program code can be identified, wherein the boot up program code is designed to invoke a trusted platform module (TPM) that measures the subsequent module of program code by performing a sequence of hashes on the subsequent module of program code, the embedded non-volatile random access memory to also store the subsequent module of program code.

16. The computing system of claim 15 wherein the boot up program code is to analyze BIOS program code.

17. The computing system of claim 15 wherein the boot up program code comprises initial boot block program code.

18. The computing system of claim 15 wherein the boot up program code is to analyze another boot up program code module.

* * * * *